United States Patent
Ha et al.

(10) Patent No.: US 9,502,999 B2
(45) Date of Patent: Nov. 22, 2016

(54) APPARATUS FOR DRIVING MOTOR AND CONTROLLING METHOD THEREOF

(71) Applicant: IUCF-HYU (Industry-University Cooperation Foundation Hanyang University), Seoul (KR)

(72) Inventors: Keun Soo Ha, Suwon-Si (KR); Rea Young Kim, Seoul (KR); Joung Ho Son, Suwon-Si (KR); Min Jae Ahn, Seoul (KR); Jae Hoon Kim, Seoul (KR); Mu Seon Woo, Suwon-Si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 14/735,670

(22) Filed: Jun. 10, 2015

(65) Prior Publication Data

US 2016/0006380 A1  Jan. 7, 2016

(30) Foreign Application Priority Data

Jun. 27, 2014  (KR) .................. 10-2014-0080065
Oct. 10, 2014  (KR) .................. 10-2014-0136991

(51) Int. Cl.
*H02P 6/16* (2016.01)
*H02P 6/14* (2016.01)
*H02P 25/08* (2016.01)

(52) U.S. Cl.
CPC ............... *H02P 6/14* (2013.01); *H02P 25/086* (2013.01); *H02P 25/089* (2016.02); *H02P 25/092* (2016.02)

(58) Field of Classification Search
CPC .. H02M 3/333507; H02P 6/14; H02P 25/22; H02P 6/12; H02P 27/06; H02P 27/16
See application file for complete search history.

(56) References Cited

U.S. PATENT DOCUMENTS

| | | | |
|---|---|---|---|
| 2006/0145639 A1* | 7/2006 | Song ....................... | H02P 6/002 318/400.26 |
| 2011/0043148 A1* | 2/2011 | Lin ......................... | H02P 6/085 318/400.13 |
| 2011/0115417 A1* | 5/2011 | Shimada ............. | H02M 7/4807 318/139 |
| 2014/0077740 A1* | 3/2014 | Son ........................ | B60L 11/007 318/454 |
| 2014/0105754 A1* | 4/2014 | Endou ..................... | F04B 35/04 417/12 |

FOREIGN PATENT DOCUMENTS

JP  4052075 B2  12/2007

* cited by examiner

*Primary Examiner* — Karen Masih
(74) *Attorney, Agent, or Firm* — NSIP Law (57) ABSTRACT

There is provided an apparatus for driving a motor including: a converter applying an input voltage to each phase winding of the motor; and a processor controlling a phase current flowing to the phase winding to which the input voltage is applied to be increased or decreased in a preset reference range and controlling phase commutation of the motor based on a change in the phase current.

17 Claims, 7 Drawing Sheets

APPARATUS FOR DRIVING MOTOR AND CONTROLLING METHOD THEREOF

CROSS-REFERENCE TO RELATED APPLICATION

This application claims the benefit of Korean Patent Application No. 10-2014-0136991, filed on Oct. 10, 2014, entitled "Apparatus for Driving Motor and Controlling Method Thereof" and Korean Patent Application No. 10-2014-0080065, filed on Jun. 27, 2014, entitled "Apparatus for Driving SRM and Controlling Method Thereof" which are hereby incorporated by reference in its entirety into this application.

BACKGROUND

The present disclosure relates to an apparatus for driving a motor and a controlling method thereof.

In a switched reluctance motor (hereinafter, referred to as a SRM), which is a motor having a form in which it has a switching control apparatus coupled thereto, both of a stator and a rotor have a salient pole type structure.

Particularly, since only a stator part has a winding wound therearound and a rotor part does not include any type winding or permanent magnet, a structure of the SRM is simple.

Due to this structural feature, the SRM has a significant advantage in terms of manufacturing and production, and has good start-up characteristics and a large torque, similar to a direct current motor. In addition, the SRM requires less maintenance and has excellent characteristics in terms of a torque per unit volume, efficiency, rating of a converter, and the like, such that the use of the SRM has gradually increased in various fields.

The SRM as described above may have various types such as a single-phase, a two-phase, a three-phase, and the like. Among others, the two-phase SRM has a driving circuit simpler than that of the three-phase SRM, such that it has been significantly prominent in applications such as a fan, a blower, a compressor, and the like.

Further, in a switching apparatus of the two-phase SRM, various schemes have been suggested and used in order to control a current of a stator winding in a single direction. As one of the suggested schemes, there is a switching apparatus using an asymmetric bridge converter for driving an existing alternate current motor.

Further, the asymmetric bridge converter is most excellent in terms of variety of a control among converters for driving the SRM, and may independently control currents of each phase to enable currents of two phases to be overlapped with each other, such that it is appropriate for a high voltage and a high capacity and has a relatively low rating voltage of a switch.

In addition, the SRM does not include a coil wound around the rotor or a magnet attached to the rotor unlike other motors, such that it may have a small inertial moment and a high speed. However, position information of the rotor is required in order to start up the motor, and a method of using a separate sensor or a method of estimating the position information without using the sensor should be applied in order to obtain the position information.

SUMMARY

An aspect of the present disclosure may provide an apparatus for driving a sensorless motor capable of solving a problem that a method (algorithm, or the like) for detecting a phase commutation point in time in each phase of a motor according to the related art is affected by noise, or the like, such as a phase current, or the like, such that accuracy in detecting the phase commutation point in time is decreased.

In an apparatus for driving a motor and a controlling method thereof according to an aspect of the present disclosure, in a process of current-control (hysteresis current control) a phase current flowing to a phase winding to which an input voltage is applied to be increased or decreased within a preset reference range, a phase commutation point in time to the other phase winding is detected using a phenomenon that a magnitude of the phase current is out of the current control at a point in time in which an inductance of the phase winding depending on a position of a rotor of the motor is decreased.

Therefore, the apparatus for driving a motor includes: a converter applying the input voltage to each phase winding of the motor through a switching operation; and a processor controlling a phase current flowing to the phase winding to which the input voltage is applied to be increased or decreased in a preset reference range and controlling phase commutation of the motor based on a change in the phase current.

That is, the processor controls a switching operation of the converter so that a magnitude of the phase current is increased or decreased within the reference range having a predetermined bandwidth based on a preset first reference current.

In addition, the processor compares the phase current and a preset second reference current with each other in the case in which the magnitude of the phase current exceeds an upper limit value of the reference range and controls the switching operation of the converter so that the input voltage is applied to the other phase winding in the case in which the magnitude of the phase current is equal to or larger than the second reference current.

In more detail, the processor includes a hysteresis controller and a phase commutation controller, wherein the hysteresis controller generates a control signal for controlling the switching operation so that the magnitude of the phase current is increased or decreased within the reference range having a predetermined bandwidth based on a preset first reference current.

In addition, the phase commutation controller generates a control signal for controlling the switching operation based on the control signal applied from the hysteresis controller, applies the generated control signal to the converter, and controls the phase commutation of the motor based on the change in the phase current.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

The objects, features and advantages of the present disclosure will be more clearly understood from the following detailed description of the exemplary embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present disclosure, when it is determined that the detailed description of the related art would obscure the gist of the present disclosure, the description thereof will be omitted.

Hereinafter, an apparatus for driving a motor and a controlling method thereof according to an exemplary embodiment of the present disclosure will be described in detail with reference to the accompanying drawings. Here, the motor may be a two-phase switched reluctance motor (hereinafter, referred to as an SRM), but is not limited thereto. Here, a current $I_D$ applied to each phase winding by an input voltage $V_{dc}$ is the same as each phase current $I_A$ or $I_B$ flowing to each phase winding, and may be measured by a current sensor (not illustrated).

Figure 1:
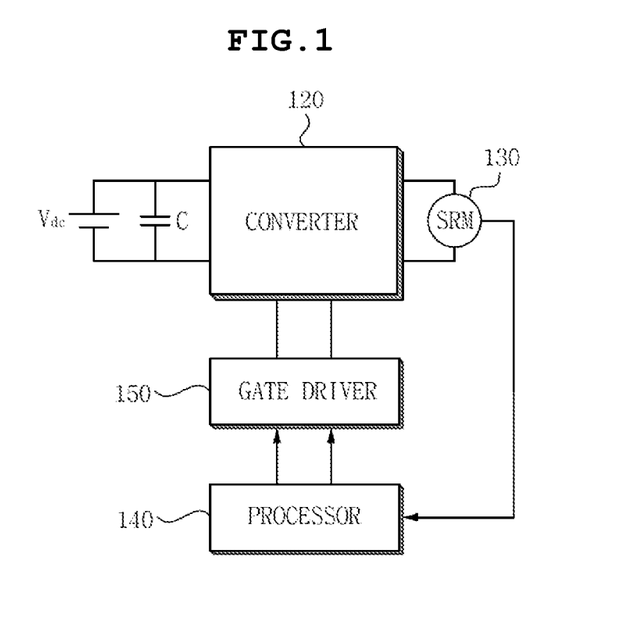
FIG. 1 is a block diagram illustrating an apparatus for driving a switched reluctance motor (SRM) according to an exemplary embodiment of the present disclosure.
Figure 2:
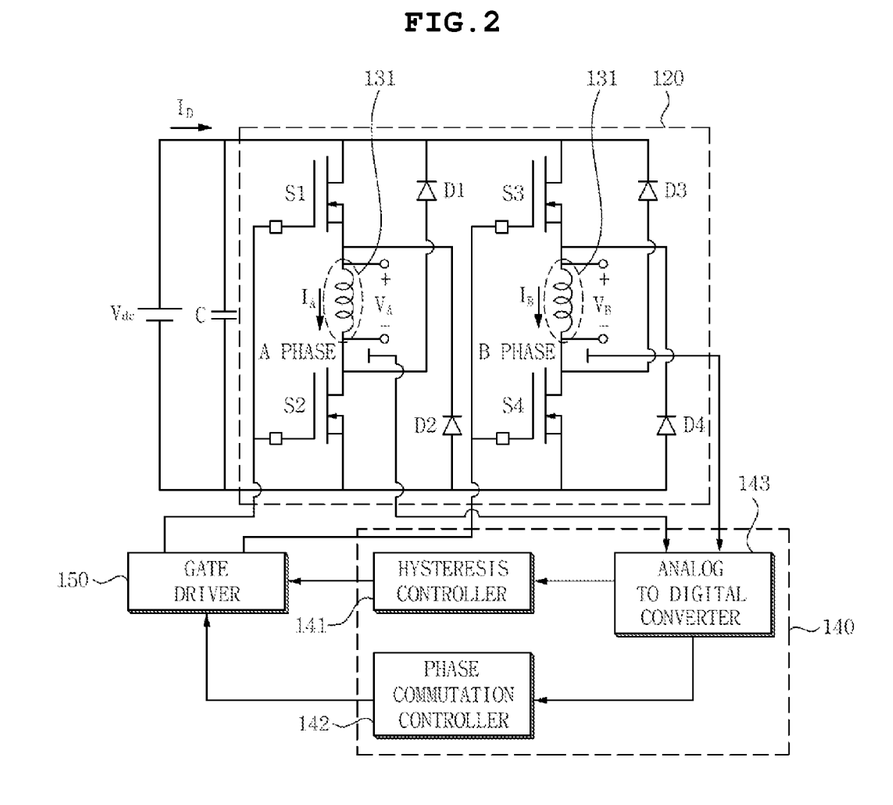
FIG. 2 is a view illustrating a circuit configuration of the apparatus for driving an SRM according to the exemplary embodiment of the present disclosure.

FIG. 1 is a block diagram illustrating an apparatus for driving a switched reluctance motor (SRM) according to an exemplary embodiment of the present disclosure; FIG. 2 is a view illustrating a circuit configuration of the apparatus for driving an SRM according to the exemplary embodiment of the present disclosure; and FIG. 3 is a view illustrating a rotor and a stator of an SRM according to the exemplary embodiment of the present disclosure.

Figure 3:
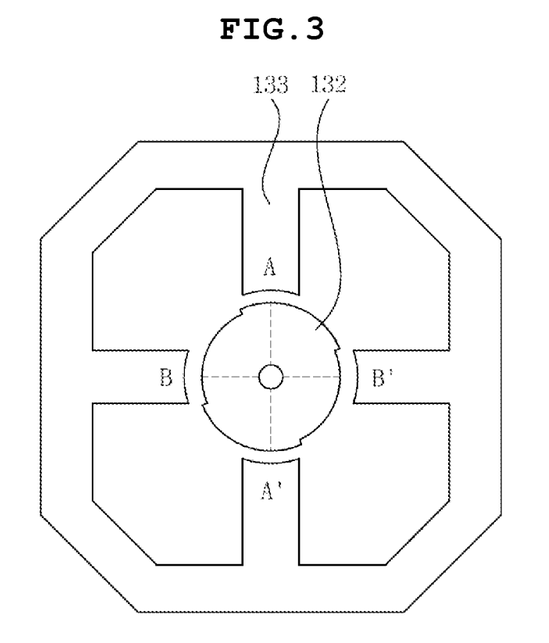
FIG. 3 is a view illustrating a rotor and a stator of an SRM according to the exemplary embodiment of the present disclosure.

As illustrated in FIGS. 1 to 3, the apparatus 10 for driving an SRM 130 according to the exemplary embodiment of the present disclosure may be configured to include a smoothing capacitor C, a converter 120, a processor 140, and a gate driver 150.

A rectifying unit (not illustrated) may rectify an alternating current (AC) voltage to generate an input voltage $V_{dc}$ having direct current (DC) type, and include a bridge rectifying circuit (not illustrated) rectifying the AC voltage. Here, the input voltage $V_{dc}$ may be a DC voltage supplied through a battery and having a predetermined magnitude, but is not limited thereto. The smoothing capacitor C smoothes the input voltage $V_{dc}$ (improves a power factor of the DC voltage and absorbs noise) to constantly maintain a magnitude of the input voltage $V_{dc}$.

The converter 120 applies the input voltage (DC voltage) $V_{dc}$ to each phase winding of the SRM 130 through a switching operation. In addition, the converter 120 includes a switching unit S1 to S4 applying the input voltage (DC voltage) to each phase winding of the SRM 130 through the switching operation and a current circulating unit D1 to D4 circulating currents flowing to each phase winding of the SRM 130 in predetermined directions during the switching operation.

As illustrated in FIG. 2, the switching unit S1 to S4 includes a first switch S1 connected in series with an upper portion of any one phase winding (A phase winding) of the SRM 130, a second switch S2 connected in series with a lower portion of any one phase winding (A phase winding) of the SRM 130, a third switch S3 connected in series with an upper portion of the other phase winding (B phase winding) of the SRM 130, and a fourth switch S4 connected in series with a lower portion of the other phase winding (B phase winding) of the SRM 130.

The current circulating unit D1 to D4 circulates the currents flowing to each phase winding of the SRM 130 in the predetermined directions, and includes first to fourth diodes D1 to D4. In addition, 1) the first diode D1 has a positive electrode connected to a contact point between the A phase winding and the second switch S2 and a negative electrode connected to the power supply unit 100, and 2) the second diode D2 has a positive electrode connected to a contact point between the A phase winding and the first switch S1 and a negative electrode connected to a ground terminal GND.

In addition, 3) the third diode D3 has a positive electrode connected to a contact point between the B phase winding and the third switch S3 and a negative electrode connected to the power supply unit 100, and 4) the fourth diode D4 has a positive electrode connected to a contact point between the B phase winding and the fourth switch S4 and a negative electrode connected to the ground terminal GND.

That is, the current $I_D$ by the input voltage $V_{ad}$ is alternately applied to each phase winding (A phase winding or B phase winding) depending on the switching operation (switch on or off) of the first switch S1 and the second switch S2 or the third switch S3 and the fourth switch S4. In addition, the phase winding (A phase winding or B phase winding) to which the input voltage $V_{dc}$ is applied is excited, and the phase current $I_A$ or $I_B$ flows to the excited phase winding.

The gate driver 150 amplifies a control signal applied from the processor 140 with a preset gain and applies the amplified control signal to the converter 120. That is, the gate driver 150 amplifies a control signal (pulse width modulation (PWM) signal) applied from a hysteresis controller 141 or a phase commutation controller 142 with a preset gain and applies the amplified control signal to the first to fourth switches of the converter 120.

The processor 140 controls the phase current $I_A$ or $I_B$ flowing to any one phase winding to which the input voltage $V_{dc}$ is applied to be maintained within a preset reference range, and controls phase commutation of the SRM based on a change in the phase current $I_A$ or $I_B$. Here, the processor 140 may include an analog to digital converter 143, the hysteresis controller 141, and the phase commutation controller 142.

That is, the processor 140 may control the phase current $I_A$ or $I_B$ to be increased or decreased within the reference range (Iref−α to Iref+α) having a predetermined bandwidth (α) based on a preset first reference current (Iref), wherein the bandwidth (α) may be set within a range of 10% of the first reference current (Iref).

In more detail, the processor 140 performs a hysteresis current control controlling switching operation of the switches S1 to S4 connected to both ends of the phase winding 131 in the case in which the phase current $I_A$ or $I_B$ arrives at an upper limit value (Iref+α) or a lower limit value (Iref−α) of the reference range, thereby controlling the phase current to be increased or decreased within the reference range (Iref−α to Iref+α), which will be described below in detail.

In addition, the processor 140 controls phase commutation of the SRM 130 based on a change in the phase current $I_A$ or $I_B$. That is, the processor 140 compares the phase current $I_A$ or $I_B$ and a preset second reference current $I_L$, and controls the input voltage $V_{dc}$ to be applied to the other phase winding in the case in which a magnitude of the phase current $I_A$ or $I_B$ is equal to or larger than that of the second reference current $I_L$, which will be described in more detail below. Here, the second reference current $I_L$ may be determined depending on the following Equation 1.

$$I_L = Iref + \beta \quad \text{[Equation 1]}$$

Here, $I_L$ means a second reference current, Iref means a first reference current, and β means a phase commutation bandwidth and is set within a range of 10 to 20% of the first reference current (Iref).

Further the processor 140 performs a control to apply the input voltage $V_{dc}$ to each phase winding (A phase winding or B phase winding) 131 at the time of initial driving of the SRM 130, such that a rotor 132 of the SRM 130 may be aligned with any one phase winding (A phase winding or B phase winding).

The processor 140, the hysteresis controller 141, the phase commutation controller 142, and the gate driver 150 described above may include an algorithm for performing the functions described above, and may be implemented by firmware, software, or hardware (for example, a semiconductor chip or an application-specific integrated circuit).

Next, a hysteresis current control and a phase commutation process in the apparatus for driving an SRM according to the exemplary embodiment of the present disclosure will be described in more detail with reference to FIGS. 4A to 7B.

First, in the apparatus for driving an SRM and the controlling method thereof according to the exemplary embodiment of the present disclosure, in a process of current-control (hereinafter, referred to as a hysteresis current control), the phase current $I_A$ or $I_B$ flowing to the phase winding to which the input voltage $V_{dc}$ is applied to be increased or decreased within the preset reference range (Iref−α to Iref+α), a phase commutation point in time to the other phase winding is detected using a phenomenon that a magnitude of the phase current $I_A$ or $I_B$ is out of the hysteresis current control at a point in time in which an inductance $L_P$ of the phase winding depending on a position of the rotor 132 of the SRM 130 is decreased.

Next, a hysteresis current control and a phase commutation point in time detecting method of the SRM 130 will be described based on a phase current $I_A$ of an A phase winding among phase windings of the SRM 130, and will be similarly applied to a phase current $I_B$ of a B phase winding.

Figure 4A:
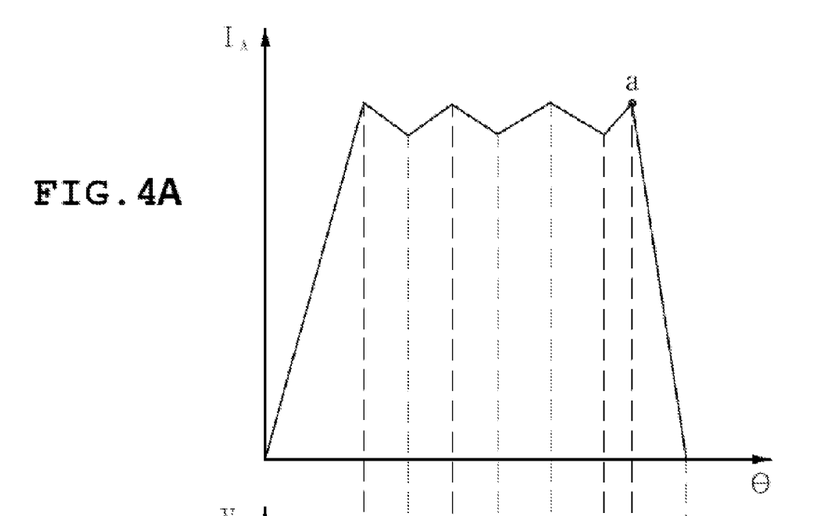
FIG. 4A is a view illustrating a change in a phase current depending on a hysteresis current control for any one phase of the apparatus for driving an SRM according to the exemplary embodiment of the present disclosure.
Figure 4B:
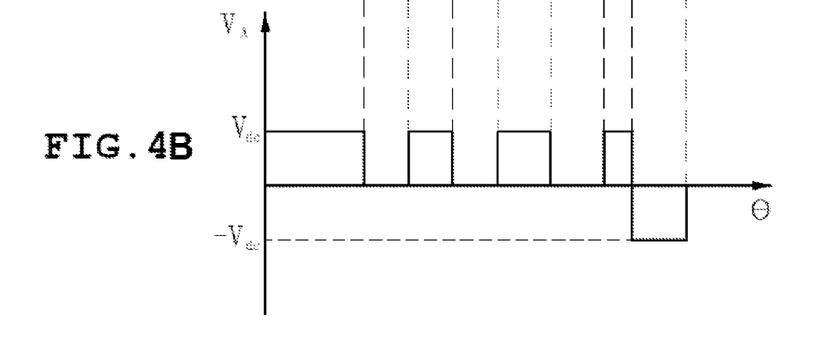
FIG. 4B is a view illustrating a change in a phase voltage of a phase winding on which the hysteresis current control is performed.

As illustrated in FIGS. 4A and 4B, at the time of the hysteresis current control in which the phase current $I_A$ of the A phase of the SRM 130 according to the exemplary embodiment of the present disclosure is controlled to be increased or decreased within the reference range (Iref−α to Iref+α) having the predetermined bandwidth (α) based on the preset first reference current (Iref), the first switch S1 and the second switch S2 of the converter 120 may be operated in a soft switching scheme depending on whether or not the phase current $I_A$ arrives at the upper limit value (Iref+α) or the lower limit value (Iref−α) of the reference range. Here, a section in which an upper switch S1 or S3 of any phase winding 131 is switched off and a lower switch S2 or S4 thereof is switched on is called a freewheeling state.

That is, in the case in which the phase current $I_A$ arrives at the upper limit value (Iref+α) of the reference range, the processor 140 controls the first switch S1 to be switched off and controls the second switch S2 to be maintained in a switch-on state, thereby decreasing the phase current $I_A$.

Therefore, as illustrated in FIG. 4A, the freewheeling state in which the first switch S1 is switched off and the second switch S2 is maintained in the switch-on state occurs, and as illustrated in FIG. 4B, a phase voltage of the A phase is converged on 0V in the freewheeling section.

Therefore, according to Equation 3 to be described below, in the case of a soft switching scheme in the hysteresis current control process, in the freewheeling state in which the first switch S1 is switched off and the second switch S2 is maintained in the switch-on state at a point in time (maximal point) in which an inductance of each phase is decreased, the phase voltage VA of the A phase is converged on 0V, such that the phase current $I_A$ of the A phase may be increased, thereby enabling a phase commutation point in time detecting method using a phenomenon that the phase current $I_A$ is out of a hysteresis current control.

Figure 5A:
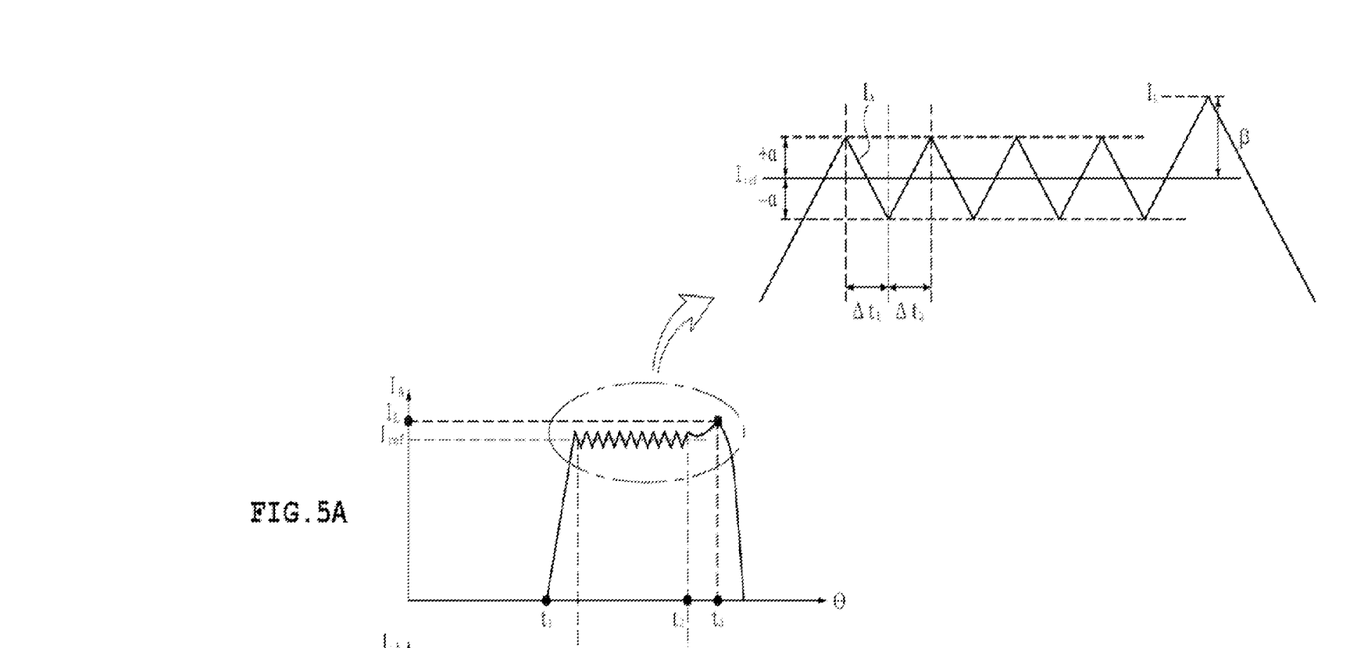
FIG. 5A is a view illustrating a hysteresis current control for a phase current of any one phase of the apparatus for driving an SRM according to the exemplary embodiment of the present disclosure and a phase commutation point in time based on a change in the phase current.

As illustrated in FIG. 5A, in the case ($t_1$) in which the input voltage $V_{dc}$ is applied to the A phase winding 131, the phase current $I_A$ flowing to the A phase is increased depending on the following Equations 2 to 4, and is controlled to be increased or decreased within the reference range through the hysteresis current control.

Figure 5B:
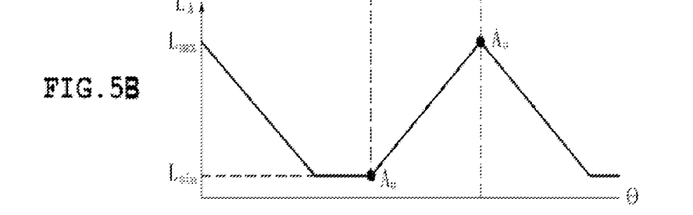
FIG. 5B is a view illustrating a change in an inductance for the phase winding corresponding to the change in the phase current.

Here, an inductance $L_A$ of the A phase is continuously increased or decreased between a minimum point $L_{min}$ and a maximum point $L_{max}$ depending on a position of the rotor 132 of the SRM 130, as illustrated in FIG. 5B. In addition, in an alignment state $A_a$, which is a case in which the stator 133 and the rotor 132 of each phase are in an alignment state, the inductance $L_A$ is maximum, and in a misalignment state $A_u$, which is a case in which the stator 133 and the rotor 132 of each phase are in a misalignment state, the inductance $L_A$ is minimum.

In principle, the phase current $I_A$ flowing to the A phase needs to be decreased at a point in time $t_2$ in which the inductance $L_A$ of the A phase becomes maximum, through the hysteresis current control. However, a phenomenon that a magnitude of the phase current $I_A$ is increased out of the hysteresis current control at the point in time $t_2$ in which the inductance $L_A$ becomes maximum appears (dIA/dt>0).

That is, according to the following Equations 2 to 4, at the point in time $t_2$ in which the inductance $L_A$ is decreased from a maximum value $L_{max}$ to a minimum value $L_{min}$, a counter electromotive force (dL(θ)/dθ) is decreased depending on a decrease in the inductance $L_A$ of the A phase and the first switch S1 is switched off due to the hysteresis current control, such that a phase voltage $V_S$ of the A phase is converged on 0V, whereby the phase current $I_A$ of the A phase is rapidly increased in spite of the hysteresis current control.

$$V_s = Ri + L(\theta)\frac{di}{dt} + i\omega\frac{dL(\theta)}{d\theta} \quad \text{[Equation 2]}$$

$$\frac{di}{dt} = \frac{V_s - Ri - i\omega\frac{dL(\theta)}{d\theta}}{L(\theta)} \quad \text{[Equation 3]}$$

$$= \frac{V_i - Ri - E}{L(\theta)} \quad \text{[Equation 4]}$$

Here, $V_S$ means a voltage of each phase (A phase or B phase), R means a winding resistance of each phase, L means an inductance of each phase, W means an angular velocity of the rotor, i means a phase current of each phase, and E means a counter electromotive force (a gradient for a change in an inductance).

Therefore, the apparatus 10 for driving an SRM according to the exemplary embodiment of the present disclosure detects a phase commutation point in time of each phase winding (A phase winding or B phase winding) based on a point in time in which the inductance $L_P$ of the phase winding is maximum, which is a state in which the phase winding (A phase winding or B phase winding) and the rotor 132 are aligned with each other, in the process of control the phase current $I_D$ flowing to the phase winding (A phase winding or B phase winding) to which the input voltage $V_{dc}$ is applied to be increased or decreased within the preset reference range.

The processor 140 controls the magnitude of the phase current $I_A$ flowing to the A phase winding to which the input voltage $V_{dc}$ is applied to be increased or decreased within the reference range (Iref−α to Iref+α) having the predetermined bandwidth (α) based on the preset first reference current (Iref).

That is, the processor 140 controls a switch-on or switch-off operation of the first switch S1 or the third switch S3 of the converter 120 depending on whether or not the phase current $I_A$ arrives at the upper limit value (Iref+α) or the lower limit value (Iref−α) of the reference range, thereby performing the hysteresis current control on the phase current (section $t_1$ to $t_2$).

In addition, the processor 140 compares the phase current $I_A$ and the preset second reference current $I_L$ with each other and controls the first to fourth switches S1 to S4 of the converter 120 so that the input voltage $V_{dc}$ is applied to the other phase winding in the case in which a magnitude of the phase current $I_A$ is equal to or larger than that of the preset second reference current $I_L$, thereby performing phase commutation.

In addition, the processor 140 controls the first to fourth switches S1 to S4 of the converter 120 at a point in time $t_3$ in which the phase current $I_A$ is rapidly increased (section $t_2$ to $t_3$) out of the hysteresis current control to arrive at the second reference current $I_L$, thereby performing phase commutation to the B phase.

That is, the phase current of each phase winding 131 of the SRM 130 is fed back to the analog to digital converter 143 to thereby be converted into a digital form, and the hysteresis controller 141 controls switching operations of the first and second switches S1 and S2 so that the phase current is increased or decreased within the reference range (Iref−α to Iref+α) having the predetermined bandwidth (α) based on the preset first reference current (Iref) based on a result value output from the analog to digital converter 143.

In more detail, the hysteresis controller 141 generates a control signal for switching off the first switch S1 of the converter 120 1) in the case (section $\Delta t_1$ in which the result value output from the analog to digital converter 143 is larger than the first reference current (Iref) and is the same as the upper limit value (Iref+α) of the reference range, and generates a control signal for switching on the first switch S1 of the converter 120 2) in the case (section $\Delta t_2$) in which the result value output from the analog to digital converter 143 is smaller than the first reference current (Iref) and is the same as the lower limit value (Iref−α) of the reference range.

Therefore, as illustrated in FIGS. 6A to 6D, 1) in a hysteresis current control section ($\Delta H_1$), the inductance $L_A$ of the A phase is increased (See FIG. 6A), such that the phase current $I_A$ of the A phase is increased by the above Equation 3.

Figure 6A:
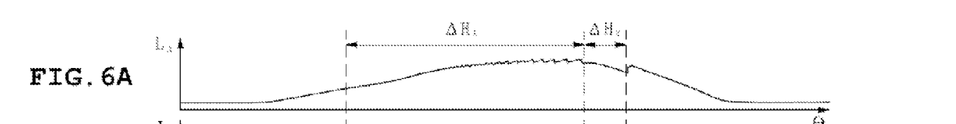
FIG. 6A is a view illustrating an inductance at the time of performing a hysteresis current control on any one phase of the apparatus for driving an SRM according to the exemplary embodiment of the present disclosure.
Figure 6B:
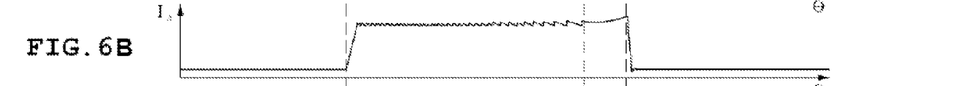
FIG. 6B is a view illustrating a phase current at the time of performing the hysteresis current control on any one phase of the apparatus for driving an SRM according to the exemplary embodiment of the present disclosure.

Therefore, the hysteresis controller 141 performs the hysteresis current control on the phase current $I_A$ of the A phase (See FIG. 6B). In addition, in the case in which the phase current $I_A$ is the same as the upper limit value (Iref+α) or the lower limit value (Iref1−α) of the reference range, the hysteresis controller 141 generates a PWM signal (See FIG. 6C) and applies the PWM signal to the gate driver 150. The gate driver 150 applies the PWM signal to the first switch S1 of the converter 120, and the first switch S1 is switched on or switched off. Here, the second switch S2 is maintained in a switch-on state.

2) In a section ($\Delta H_2$) in which the inductance $L_A$ of the A phase is decreased, as described above, the phase current $I_A$ of the A phase is rapidly increased in spite of the hysteresis current control by the hysteresis controller 141.

Figure 6C:
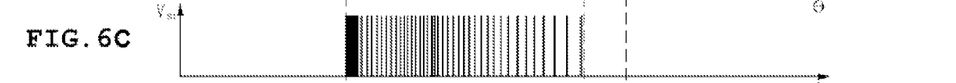
FIGS. 6C and 6D are views illustrating control signals applied to a switching unit of a converter at the time of performing the hysteresis current control on any one phase of the apparatus for driving an SRM according to the exemplary embodiment of the present disclosure.
Figure 6D:
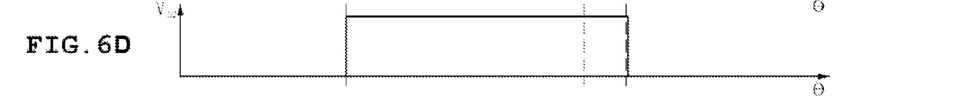

Therefore, the hysteresis controller 141 does not apply the PWM signal to the first switch S1 in order to prevent a rapid increase in the phase current, such that the first switch S1 is switched off.

In addition, the phase current of each phase winding 131 of the SRM 130 is fed back to the analog to digital converter 143 to thereby be converted into a digital form, and the phase commutation controller 142 compares the result value output from the analog to digital converter 143 and the preset second reference current value $I_L$ and controls switching operations of the first to fourth switches so that the input voltage $V_{dc}$ to be applied to the other phase winding in the case in which the result value is equal to or larger than the second reference current value $I_L$.

That is, as illustrated in FIGS. 5A to 7B, in the case in which the result value for the phase current $I_A$ output from the analog to digital converter is equal to or larger than the second reference current value $I_L$, the phase commutation controller 142 generates a control signal for switching off the first and second switches S1 and S2 of the A phase and switching on the third and fourth switches S3 and S4 of the B phase.

In more detail, in the case in which the result value for the phase current $I_A$ output from the analog to digital converter is equal to or larger than the second reference current value $I_L$, the phase commutation controller 142 transmits the control signal for switching off the first and second switches S1 and S2 of the A phase and switching on the third and fourth switches S3 and S4 of the B phase to the gate driver 150. In addition, the gate driver 150 amplifies the control signal with a predetermined gain and applies the amplified control signal to the first to fourth switches, such that the input voltage is applied to the B phase, thereby performing phase commutation exciting the B phase. Here, the control signal for operating the first and third switches S1 and S3 may be a PWM signal.

As described above, in the apparatus for driving an SRM and the controlling method thereof according to the exemplary embodiment of the present disclosure, in the process of current-control (hysteresis current control) the phase current $I_D$ flowing to the phase winding to which the input voltage $V_{dc}$ is applied to be increased or decreased within the preset reference range (Iref−α to Iref+α), the phase commutation point in time to the other phase winding is detected using the phenomenon that the magnitude of the phase current is out of the current control at the point in time in which the inductance $L_P$ of the phase winding depending on the position of the rotor (not illustrated) of the SRM 130 is decreased, such that the phase commutation point in time may be more easily detected by setting only a bandwidth of the hysteresis current control and a limit current for detecting the phase commutation point in time.

In addition, as compared with a scheme according to the related art, an algorithm for detecting the phase commutation point in time of the SRM may be more simply implemented in terms of software and is less affected by noise in a process of sensing the phase current in terms of hardware, thereby making it possible to secure accuracy in detecting the phase commutation point in time of the SRM.

Figure 8:
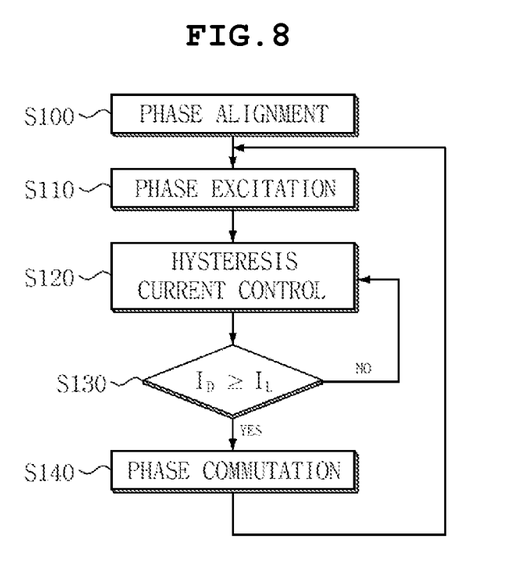
FIG. 8 is a view illustrating a controlling method of an apparatus for driving an SRM according to the exemplary embodiment of the present disclosure.

Next, a phase commutation process of the apparatus for driving an SRM according to the exemplary embodiment of the present disclosure will be described in more detail with reference to FIG. 8.

First, a driving state of the SRM is configured of an initialization step in which a micro controller unit (MCU), or the like, is initialized, a stop step in which driving of the SRM is in a stop state, an aligning step of aligning the rotor with any one phase winding, a start-up step of performing a start-up of the SRM, and a run step.

Here, the phase commutation process according to the controlling method of an apparatus for driving an SRM described above may be applied to the run step as well as the start-up step of the SRM 130.

Next, the phase commutation process in the start-up step will be described based on any one phase (A phase). However, the phase commutation process may be similarly applied to the other phase (B phase).

Figure 7A:
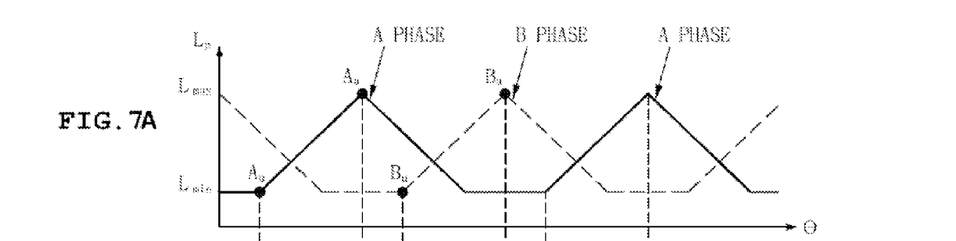
FIG. 7A is a view illustrating a change in an inductance in each phase winding of the SRM according to the exemplary embodiment of the present disclosure.
Figure 7B:
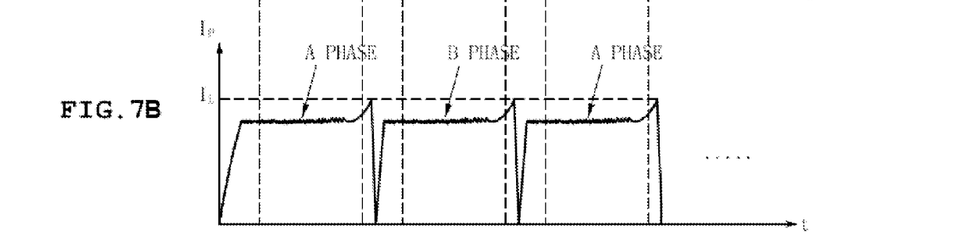
FIG. 7B is a view illustrating a hysteresis current control and a phase commutation point in time for each phase of the apparatus for driving an SRM according to the exemplary embodiment of the present disclosure.

As illustrated in FIGS. 7A and 7B, in the case in which the SRM 130 is again driven after the driving of the SRM 130 is stopped or in the case in which the SRM 130 is initially driven depending on selection (switch-on or switch-off) of a user, the phase winding (A phase winding or B phase winding) with which the rotor (not illustrated) is aligned may not be appreciated.

Therefore, the processor 140 controls the switching operation of the converter 120 to apply the input voltage $V_{dc}$ to each phase winding (A phase winding and B phase winding), thereby aligning the rotor (not illustrated) with any one phase (A phase winding or B phase winding) (S100). Here, a duty ratio of the PWM signal applied to the switches S1 to S4 of the converter 120 by the processor 140 may be about 5 to 10%.

Next, the processor 140 controls the switching operation of the converter 120 to apply the input voltage $V_{dc}$ to a phase winding with which the rotor (not illustrated) is not aligned, thereby exciting the phase winding (S110).

That is, the phase commutation controller 142 controls the switching operation of the converter 120 to align the rotor (not illustrated) to any one phase (for example, the B phase) and then apply the input voltage to the other phase (for example, the A phase), thereby exciting the other phase.

Here, the inductance $L_A$ of the excited A phase has a minimum value $L_{min}$ in a state in which the rotor 132 is aligned with the B phase. Therefore, according to the above Equation 2, a gradient (di/dt) of the phase current $I_A$ of the A phase has a positive (+) value since there is no change in the inductance $L_A$. As a result, the phase current $I_A$ of the A phase is increased.

Next, the processor 140 controls (hysteresis current control) the switching operation of the converter 120 so that the magnitude of the phase current $I_A$ of the A phase is increased or decreased within the reference range (Iref−α to Iref+α) having the predetermined bandwidth (α) based on the preset first reference current (Iref) (S120).

That is, the hysteresis controller 141 generates the control signal for switching off the first switch S1 of the converter 120 in the case (section $\Delta t_1$) in which the phase current $I_D$ arrives the upper limit value (Iref+α) of the reference range and generates the control signal for switching on the first switch S1 in the case (section $\Delta t_2$) in which the phase current $I_D$ arrives the lower limit value (Iref−α) of the reference range (See FIGS. 5A and 5B).

Here, the inductance $L_A$ of the A phase is increased as the rotor 132 of the SRM 130 rotates toward the A phase and has a maximum value $L_{max}$ in the case in which the rotor 132 is aligned with the A phase.

According to the above Equation 3, a gradient of the phase current $I_A$ of the A phase has a negative (−) value due to an increase in a counter electromotive force E depending on an increase in the inductance $L_A$ of the A phase. As a result, the phase current $I_A$ of the A phase is decreased.

Then, the processor 140 compares the phase current $I_A$ of the A phase and the preset second reference current $I_L$ with each other to determine whether or not the phase commutation of the SRM 130 is performed (second control step) (S130). That is, the phase commutation controller 142 compares the phase current $I_A$ and the preset second reference current $I_L$ with each other and controls the switching operation of the converter 120 in the case in which the phase current $I_A$ is equal to or larger than the preset second reference current $I_L$, thereby performing the phase commutation in which the input voltage $V_{dc}$ is applied to the B phase.

Here, the inductance $L_A$ of the A phase has the maximum value $L_{max}$ in the case in which the rotor 132 is aligned with the A phase, and starts to be decreased at a point in time $A_a$ in which the rotor 132 starts to rotate toward the B phase. Therefore, according to the above Equation 3, a counter electromotive force E has a negative (−) value. As a result, the phase current $I_A$ of the A phase is increased out of the hysteresis current control.

Finally, the processor 140 controls the switching operation of the converter 120 in the case in which the phase current $I_A$ of the A phase is increased to the second reference current $I_L$ or more, thereby performing the phase commutation in which the input voltage $V_{dc}$ is applied to the B phase (S140). In addition, the phase commutation point in time detection and phase commutation process for the A phase described above are repeatedly performed in the B phase.

Although the embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the disclosure.

Accordingly, any and all modifications, variations or equivalent arrangements should be considered to be within the scope of the disclosure, and the detailed scope of the disclosure will be disclosed by the accompanying claims.

What is claimed is:

1. An apparatus for driving a motor, comprising:
a converter configured to apply an input voltage to each phase winding of the motor;
a processor configured to control a phase current flowing to any one phase winding to which the input voltage is applied to maintain the phase current in a preset reference range, and control phase commutation of the motor based on a change in the phase current,
wherein the processor is further configured to control the phase current to be increased or decreaseed within the preset reference range having a predetermined bandwidth based on a first reference current.

2. The apparatus for driving a motor of claim 1, wherein the processor is further configured to control switching operations of switches connected to both ends of the phase winding in the case in which the phase current arrives at an upper limit value or a lower limit value of the reference range, to thereby control the phase current to be increased or decreased within the reference range.

3. The apparatus for driving a motor of claim 1, wherein the processor is further configured to compare the phase current and a preset second reference current with each other and control the input voltage to be applied to the other phase winding in the case in which a magnitude of the phase current is equal to or larger than that of the second reference current.

4. The apparatus for driving a motor of claim 3, wherein the bandwidth is set within a range of 10% of the first reference current, and
the second reference current is determined by the equation:

$$IL = Iref + \beta$$

where IL is the second reference current, Iref is the first reference current, and $\beta$ is a phase commutation bandwidth set within a range of 10 to 20% of the first reference current.

5. The apparatus for driving a motor of claim 1, wherein the processor is further configured to apply the input voltage to each phase winding at the time of initial driving of the motor, such that a rotor of the motor is aligned with any one phase winding.

6. An apparatus for driving a motor, comprising:
a converter configured to apply an input voltage to each phase winding of the motor;
a processor configured to control a phase current flowing to any one phase winding to which the input voltage is applied to maintain the phase current in a preset reference range, and control phase commutation of the motor based on a change in the phase current,
wherein the converter comprises a switching unit configured to apply the input voltage to each phase winding of the motor through a switching operation,
the switching unit comprising:
a first switch connected in series with an upper portion of any one phase winding of the motor;
a second switch connected in series with a lower portion of any one phase winding of the motor;
a third switch connected in series with an upper portion of the other phase winding of the motor; and
a fourth switch connected in series with a lower portion of the other phase winding of the motor.

7. The apparatus for driving a motor of claim 6, wherein the processor comprises:
an analog to digital converter configured to convert the phase current flowing to any one phase winding into a digital form;
a hysteresis controller configured to control switching operations of the first and second switches so that the phase current is increased or decreased within the reference range having a predetermined bandwidth based on a preset first reference current based on a result value output from the analog to digital converter; and
a phase commutation controller configured to compare the result value output from the analog to digital converter and a preset second reference current value with each other and control switching operations of the first to fourth switches so that the input voltage is applied to the other phase winding in the case in which the result value is equal to or larger than the second reference current value.

8. The apparatus for driving a motor of claim 7, wherein the hysteresis controller is further configured to generate a control signal for switching off the first switch in the case in which the result value is the same as an upper limit value of the reference range and generate a control signal for switching on the first switch in the case in which the result value is the same as a lower limit value of the reference range.

9. The apparatus for driving a motor of claim 8, wherein the phase commutation controller is further configured to generate a control signal for switching off the first and second switches and switching on the third and fourth switches in the case in which the result value output from the analog to digital converter is equal to or larger than the second reference current value.

10. The apparatus for driving a motor of claim 1, further comprising a gate driver configured to amplify a control signal applied from the processor with a preset gain and apply the amplified control signal to the converter.

11. A controlling method of an apparatus for driving a motor, comprising:
applying an input voltage having a predetermined magnitude to each phase winding of the motor so that a rotor of the motor is aligned with any one phase winding;
controlling a phase current flowing to any one phase winding to which the input voltage is applied to maintain the phase current within a preset reference range; and
performing phase commutation of the motor based on a change in the phase current.

12. The controlling method of an apparatus for driving a motor of claim 11, wherein the controlling of the phase current comprises:

controlling the phase current to be increased or decreased within the reference range having a predetermined bandwidth based on a preset first reference current.

13. The controlling method of an apparatus for driving a motor of claim 12, wherein the controlling of the phase current further comprises:

converting, by an analog to digital converter, the phase current into a digital form and outputting the phase current in the digital form; and controlling, by hysteresis controller, switching operations of first and second switches of a converter so that the phase current is increased or decreased within the reference range having the predetermined bandwidth based on the preset first reference current based on a result value output from the analog to digital converter.

14. The controlling method of an apparatus for driving a motor of claim 13, wherein the controlling of the switching operations comprises:

generating a control signal for switching off the first switch in the case in which the result value output from the analog to digital converter is the same as an upper limit value of the reference range; and generating a control signal for switching on the first switch in the case in which the result value is the same as a lower limit value of the reference range.

15. The controlling method of an apparatus for driving a motor of claim 12, wherein the performing of the phase commutation comprises:

converting, by an analog to digital converter, the phase current into a digital form and outputting the phase current in the digital form; and comparing, by a phase commutation controller, a result value output from the analog to digital converter and a preset second reference current value with each other and controlling switching operations of first to fourth switches so that the input voltage is applied to the other phase winding in the case in which the result value is equal to or larger than the second reference current value.

16. The controlling method of an apparatus for driving a motor of claim 15, wherein the comparing of the result value comprises:

comparing the result value output from the analog to digital converter and the preset second reference current value with each other; and generating a control signal for switching off the first and second switches of a converter and switching on the third and fourth switches in the case in which the result value output from the analog to digital converter is equal to or larger than the second reference current value.

17. The controlling method of an apparatus for driving a motor of claim 16, further comprising:

amplifying, by a gate driver, the control signal applied from a hysteresis controller or the phase commutation controller with a preset gain and applying the amplified control signal to the first to fourth switches.

\* \* \* \* \*